United States Patent
Tsutsumi et al.

(10) Patent No.: US 9,035,485 B2
(45) Date of Patent: May 19, 2015

(54) POWER CONDITIONER FOR FEEDING SYSTEM

(75) Inventors: Kazuo Tsutsumi, Akashi (JP); Takahiro Matsumura, Kobe (JP); Chiyoharu Tonda, Kobe (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 786 days.

(21) Appl. No.: 13/258,413

(22) PCT Filed: Mar. 19, 2010

(86) PCT No.: PCT/JP2010/002012
§ 371 (c)(1),
(2), (4) Date: Dec. 13, 2011

(87) PCT Pub. No.: WO2010/109840
PCT Pub. Date: Sep. 30, 2010

(65) Prior Publication Data
US 2012/0091806 A1   Apr. 19, 2012

(30) Foreign Application Priority Data

Mar. 24, 2009 (JP) .................................. 2009-072178
Jul. 7, 2009 (JP) .................................. 2009-160910

(51) Int. Cl.
*B60L 1/00* (2006.01)
*B60M 3/02* (2006.01)
(Continued)

(52) U.S. Cl.
CPC .............. *B60M 3/02* (2013.01); *B60L 2200/26* (2013.01); *B60L 2210/30* (2013.01); *B60L 2210/40* (2013.01); *H01M 2/1061* (2013.01); *H01M 10/345* (2013.01); *H01M 10/5032* (2013.01); *H01M 10/5059* (2013.01); *H01M 10/5063* (2013.01); *H02J 3/32* (2013.01);
(Continued)

(58) Field of Classification Search
USPC ........................................ 307/9.1, 48
See application file for complete search history.

(56) References Cited

U.S. PATENT DOCUMENTS 4,468,572 A * 8/1984 Miura et al. .................... 307/69
5,280,418 A   1/1994 Griffin
(Continued)

FOREIGN PATENT DOCUMENTS

JP   09-136560 A   5/1997
JP   2000-006693 A   1/2000
(Continued)

OTHER PUBLICATIONS

English-language translation of "Electric Railway Handbook," Corona Publishing Co., Ltd., p. 585, including Table 7.58 and Table 7.59, Feb. 28, 2007.
(Continued)

*Primary Examiner* — Robert L. Deberadinis
(74) *Attorney, Agent, or Firm* — Marshall Gerstein & Borun LLP

(57) ABSTRACT

A power conditioner for a feeding system which stabilizes a load of active power is provided. A power conditioner for a feeding system comprises a first AC-DC and DC-AC converter for performing conversion between AC power and DC power; and a nickel-metal hydride battery disposed between and connected to a high-voltage cable at DC side of the first AC-DC and DC-AC converter and a low-voltage cable at the DC side of the first AC-DC and DC-AC converter.

17 Claims, 12 Drawing Sheets

(51) Int. Cl.
*H01M 2/10* (2006.01)
*H01M 10/34* (2006.01)
*H01M 10/647* (2014.01)
*H01M 10/6557* (2014.01)
*H01M 10/6561* (2014.01)
*H02J 3/32* (2006.01)

(52) U.S. Cl.
CPC .............. *Y02E 60/124* (2013.01); *Y02E 60/721* (2013.01); *Y02E 70/30* (2013.01); *Y02T 10/7241* (2013.01); *Y04S 10/126* (2013.01)

(56) References Cited

U.S. PATENT DOCUMENTS

| | | |
|---|---|---|
| 5,489,484 A | 2/1996 | Wheeler et al. |
| 5,620,808 A | 4/1997 | Wheeler et al. |
| 5,789,101 A | 8/1998 | Wheeler et al. |
| RE37,226 E | 6/2001 | Wheeler et al. |
| 8,598,739 B2 * | 12/2013 | Tsutsumi et al. ............... 307/48 |
| 2004/0112320 A1 * | 6/2004 | Bolz et al. ............... 123/179.28 |
| 2005/0202290 A1 | 9/2005 | Merzougui et al. |

FOREIGN PATENT DOCUMENTS

| | | |
|---|---|---|
| JP | 2005-073459 A | 3/2005 |
| JP | 2005-206111 A | 8/2005 |
| JP | 2007-083989 A | 4/2007 |
| RU | 2121196 C1 | 10/1998 |
| WO | WO-2008/099609 A1 | 8/2008 |

OTHER PUBLICATIONS

"Electric Railway Handbook," Corona Publishing Co., Ltd., p. 585, Feb. 28, 2007.

International Search Report for PCT/JP2010/002012, mailed Jun. 22, 2010.

Decision to Grant for Russian Patent Application No. 2011142749, Sep. 23, 2013.

Extended European Search Report for EP 10755643.3, mailed Mar. 3, 2015.

* cited by examiner

POWER CONDITIONER FOR FEEDING SYSTEM

TECHNICAL FIELD

The present invention relates to power conditioners for feeding systems for use with electric railways.

BACKGROUND ART

An AC feeding circuit is suitable for long-distance and large-capacity power supply, and therefore is used for power supply for bullet trains and others. An electric railway is a single-phase load. Therefore, generally, in AC traction substation, a three-phase to two-phase transformer transforms three-phase power received from electric power companies, etc., into one pair of single-phase powers having a phase difference of 90 degrees (e.g., see Non-Patent Literature 1). As the three-phase to two-phase transformer, a Scott-T transformer (receiving voltage: 66 kV~154 kV) or a modified Woodbridge transformer (receiving voltage: 187 kV~275 kV) is used to avoid unbalance of three-phase power supply.

In addition, in order to address a voltage fluctuation, the AC traction substation is equipped with a static VAR compensator (SVC). The SVC not only makes compensation for reactive power (VAR compensation) but also regulates active power by using inverters.

FIG. 11A is a connection diagram showing an SVC installed at feeding side in the Scott-T transformer in a conventional AC traction substation. This SVC is typically called railway static power conditioner (RPC). R-phase, S-phase, and T-phase represent inputs at three-phase side in the Scott-T transformer, respectively. Main-phase and Teaser indicate two single-phase powers formed by the Scott-T transformer, respectively. The power conditioner (RPC) 2a includes inverters 6m and 6t connected to feeders 4m and 4t in the Main-phase and the Teaser, respectively, and a DC capacitor 20 provided between and connected to the two inverters 6m and 6t. Electric trains 8m and 8t run by using electric powers supplied to the feeders 4m and 4t in the Main-phase and the Teaser, respectively, as power sources.

In the Scott-T transformer, if a load in the Main-phase and a load in the Teaser are balanced, a load at the three-phase side is also balanced. In addition, a voltage fluctuation is less when reactive power is low. Accordingly, the power conditioner (RPC) 2a is configured in such a manner that the inverters 6m and 6t connected to the Main-phase and Teaser, respectively, make compensation for the reactive power, and these two inverters mutually accommodate ½ of a difference between active powers in the two single-phase powers to equalize the active power in the Main-phase and the active power in the Teaser, thereby balancing the load at the three-phase side.

FIG. 11B is a connection diagram showing an SVC installed at the three-phase side in the Scott-T transformer. FIG. 11C is a connection diagram showing an SVC in which inverters are installed in Main-phase and Teaser in a scalene Scott-T transformer in which Main-phase and Teaser in Scott-T transformer are directly connected to each other and single-phase feeding by Slant-phase is performed, and these two inverters are connected to each other by a DC circuit. The SVC shown in FIG. 11B is called "three-phase SVC." The SVC shown in FIG. 11C is also called single-phase feeding power conditioner (SFC). A three-phase SVC 202a includes an inverter 6 and a DC capacitor 20 connected to the inverter 6, while an SFC 402a includes inverters 6m and 6t, and a DC capacitor 20 connected to the inverters 6m and 6t. The inverters 6, 6m and 6t make compensation for the reactive power and regulate the active power.

In AC feeding, in a single-phase circuit extending from an AC traction substation to a sectioning post, a phenomenon (problem) occurs. That is, a voltage drop occurs by running of an electric train, due to resistance or reactance of railway impedance in a feeder, and thereby a desired feeder voltage at a terminal end of the feeder is not attained. To obviate the phenomenon (problem), Patent Literature 1 discloses a feeder voltage regulator at a terminal end of a feeder to make compensation for a voltage fluctuation at the terminal end of the feeder by using an interactive converter (inverter) connected via an interactive transformer at the terminal end of the feeder. The feeder voltage regulator is configured in such a manner that a battery for making compensation for a long-term fluctuation in active power and a DC capacitor for making compensation for a short-term fluctuation in the active power are connected in parallel at DC side of the interactive converter (inverter).

CITATION LISTS

Non-Patent Literature

Non-patent Literature 1: "electric railway hand book" edited by electric railway hand book committee, CORONA PUBLISHING CO., LTD. Feb. 28, 2007, p. 585

Patent Literature

Patent Literature 1: Japanese Laid-Open Patent Application Publication No. 2000-6693

SUMMARY OF THE INVENTION

Technical Problem

In the equipment of the feeder voltage regulator disclosed in the above Patent Literature 1, the DC capacitor is connected to prevent the voltage drop associated with the reactive power at the terminal end of the feeder and to make compensation for the reactive power, and the battery is connected to make compensation for the long-term fluctuation in the active power. However, the feeder voltage regulator has drawbacks that the DC capacitor requires a wide space for installation, reliability is not always high, cost is high, etc.

An object of the present invention is to provide a power conditioner with simple equipment configuration which allows active power to be accommodated between feeding circuits and regulates reactive power to prevent a feeder voltage drop. That is, an object of the present invention is to provide a power conditioner without a need for providing a capacitor, which is inexpensive, compact, and space-saving, and highly reliable.

Solution to Problem

The inventors of the present invention studied intensively and discovered that a nickel-metal hydride battery has an adequate capacitance. In other words, the inventors discovered that the nickel-metal hydride battery is not only used as a secondary battery but also can function adequately as a capacitor. Accordingly, the inventors conceived a configuration in which in the power conditioner in the present invention, the nickel-metal hydride battery is disposed between and connected to a high-voltage cable and a low-voltage cable of an AC-DC and DC-AC converter for performing conversion between AC power and DC power, to store (accumulate) in the nickel-metal hydride battery, surplus regenerative power at a feeder and to regulate reactive power for preventing a feeder voltage drop. In brief, the present invention is a use invention of the nickel-metal hydride battery.

A power conditioner of the present invention comprises: a first AC-DC and DC-AC converter for performing conversion between AC power and DC power; and a nickel-metal hydride battery disposed between and connected to a high-voltage cable at DC side of the first AC-DC and DC-AC converter and a low-voltage cable at the DC side of the first AC-DC and DC-AC converter. That is, the nickel-metal hydride battery is disposed between and connected to the high-voltage cable and the low-voltage cable of the AC-DC and DC-AC converter, instead of a capacitor.

The power conditioner of the present invention may further comprise a first transformer which receives AC power from AC power line and feeds the AC power to a feeder; and wherein AC side of the first AC-DC and DC-AC converter is connected to power receiving side or power feeding side in the first transformer.

In the power conditioner of the present invention, the first transformer may be a transformer which converts a received three-phase AC voltage into two two-phase AC voltages having a phase difference of 90 degrees and feeds the two two-phase AC voltages.

The power conditioner of the present invention may further comprise a second AC-DC and DC-AC converter for performing conversion between AC power and DC power; wherein the first transformer is a transformer which converts received three-phase AC voltage into two-phase AC voltages and feeds the two-phase AC voltages; the first AC-DC and DC-AC converter is connected to a feeder which receives one of the two-phase voltages fed from the first transformer; the second AC-DC and DC-AC converter is connected to a feeder which receives the other of the two-phase voltages fed from the first transformer; and the nickel-metal hydride battery is disposed between and connected to a common high-voltage cable between the DC side of the first AC-DC and DC-AC converter and the DC side of the second AC-DC and DC-AC converter and a low-voltage cable between the DC side of the first AC-DC and DC-AC converter and the DC side of the second AC-DC and DC-AC converter.

The power conditioner of the present invention may further comprise a second transformer which receives AC power from an AC power line and feeds the AC power to a feeder; and a second AC-DC and DC-AC converter for performing conversion between AC power and DC power; wherein each of the first transformer and the second transformer is a transformer which receives single-phase AC voltage; the first AC-DC and DC-AC converter is connected to a feeder which receives the AC voltage fed from the first transformer; the second AC-DC and DC-AC converter is connected to a feeder which receives the AC voltage fed from the second transformer; and the nickel-metal hydride battery is disposed between and connected to a high-voltage cable between DC side of the first AC-DC and DC-AC converter and DC side of the second AC-DC and DC-AC converter and a low-voltage cable between the DC side of the first AC-DC and DC-AC converter and the DC side of the second AC-DC and DC-AC converter.

The nickel-metal hydride battery preferably has a layer-stacked structure. The nickel-metal hydride battery preferably includes a conductive material containing carbon. The inventors of the present invention found out that the capacitance of the nickel-metal hydride battery can be increased particularly by forming the nickel-metal hydride battery in the layer-stacked structure or by using the conductive material containing carbon.

The nickel-metal hydride battery may be composed of one or more battery modules; each of the battery modules includes plural unit batteries, each of which includes a plate-shaped positive electrode current collector and a plate-shaped negative electrode current collector which are provided opposite to each other; a separator disposed between the positive electrode current collector and the negative electrode current collector; and a positive electrode cell being in contact with the positive electrode current collector, and a negative electrode cell being in contact with the negative electrode current collector, the plural unit batteries being stacked together such that the positive electrode current collector of one of adjacent unit batteries and the negative electrode current collector of the other of the adjacent unit batteries are opposite to each other, and the battery module has between the adjacent unit batteries, a passage through which a gaseous or liquid heat transmitting medium flows.

A switch may be provided between the transformer and the AC-DC and DC-AC converter.

The power conditioner of the present invention may further comprise a second AC-DC and DC-AC converter for performing conversion between AC power and DC power; wherein AC side of the first AC-DC and DC-AC converter is connected to an end portion of a first feeding section; AC side of the second AC-DC and DC-AC converter is connected to an end portion of a second feeding section which is electrically isolated from the first feeding section; and the nickel-metal hydride battery is disposed between and connected to a common high-voltage cable between the DC side of the first AC-DC and DC-AC converter and DC side of the second AC-DC and DC-AC converter and a low-voltage cable between the DC side of the first AC-DC and DC-AC converter and the DC side of the second AC-DC and DC-AC converter.

The above and further objects, features and advantages of the present invention will more fully be apparent from the following detailed description of preferred embodiments with accompanying drawings.

Advantageous Effects of the Invention

By utilizing the present invention, the power conditioner of the present invention can accommodate active power between feeding circuits and regulate reactive power to prevent a voltage fluctuation at a feeder. Further, the power conditioner of the present invention does not require a capacitor for maintaining a voltage at the feeder.

The power conditioner of the present invention allows regenerative electric power unconsumed within a certain feeding section to be stored in the nickel-metal hydride battery for reuse. The power conditioner of the present invention allows electric power to be supplied to a feeder by discharging the nickel-metal hydride battery, thereby preventing a voltage drop at a feeder. This makes it possible to mitigate an influence on a power receiving side which would be caused by a rapid fluctuation in an electric train load. Furthermore, by utilizing the power conditioner of the present invention, an electric train stopping in a middle of a certain feeding section can be moved to a nearest station by driving power fed from the nickel-metal hydride battery even when feeding from electric power system is stopped.

DESCRIPTION OF EMBODIMENTS

Figure 1:
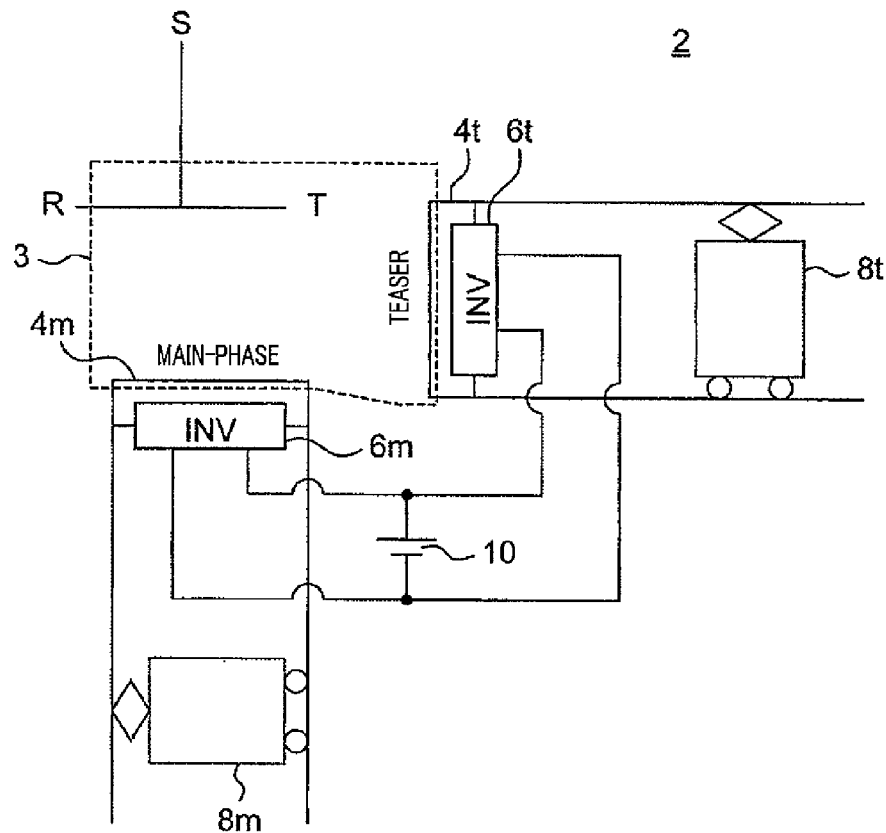
FIG. 1A is a connection diagram of a power conditioner according to Embodiment 1 of the present invention.
FIG. 1B is a more detailed connection diagram of the power conditioner according to Embodiment 1 of the present invention.
Figure 1:
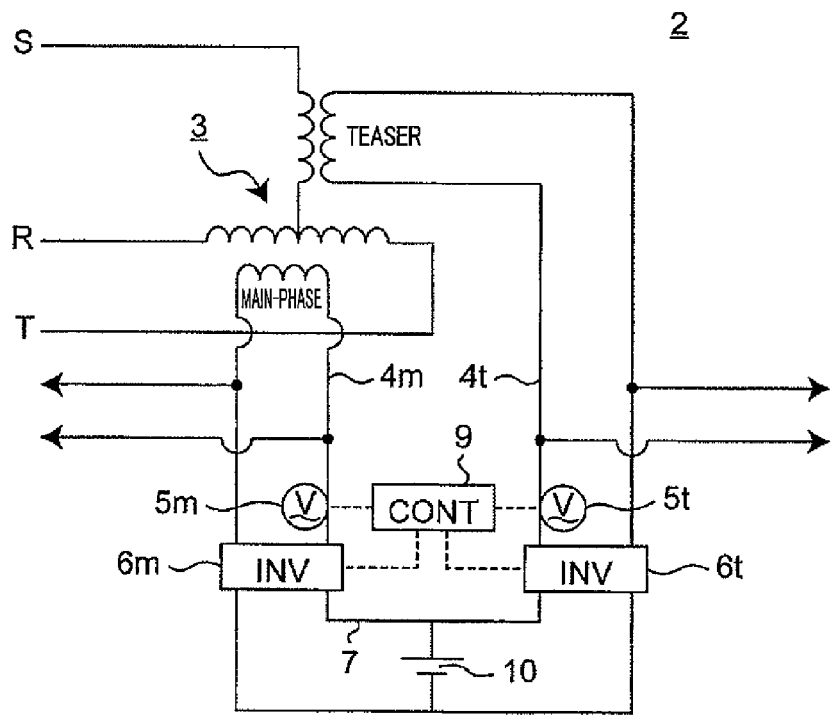

Hereinafter, preferred embodiments of the present invention will be described with reference to the drawings.

1. Embodiment 1

FIG. 1A is a connection diagram of a power conditioner 2 according to Embodiment 1 of the present invention. FIG. 1B is a more detailed connection diagram of the power conditioner 2 according to Embodiment 1 of the present invention.

In Embodiment 1, the power conditioner 2 is SVC (railway static power conditioner) and constitutes RPC installed at a power feeding side (feeding side) in a Scott-T transformer 3 which receives AC power from an AC power line in an AC traction substation and feeds the AC power to a feeder. R-phase, S-phase and T-phase indicate inputs at three-phase side in the Scott-T transformer 3, respectively. Main-phase and Teaser represent two single-phase powers formed by the Scott-T transformer 3. In Embodiment 1, the SVC 2 includes inverters (AC-DC and DC-AC converters) 6m and 6t connected at their AC sides to feeders 4m and 4t in the Main-phase and the Teaser, respectively, to perform conversion between AC power and DC power, and a nickel-metal hydride battery 10 disposed between and connected to cables at DC sides of the two inverters 6m and 6t. An electric train 8m runs by using electric power supplied to the feeder 4m in the Main-phase as driving power source, while an electric train 8t runs by using electric power supplied to the feeder 4t in the Teaser as driving power source.

The inverters 6m and 6t included in the power conditioner 2 of the present embodiment are according to a conventional art, and each of them includes a rectifier circuit including a plurality of diodes, a switching circuit including a plurality of switching elements, a capacitor, etc. To be specific, each of the inverters 6m and 6t includes an AC-DC converter and a DC-AC converter.

The nickel-metal hydride battery 10 is provided between and connected to DC input/output ends of the two inverters 6m and 6t which are connected to a common high-voltage cable at DC side, and DC input/output ends of the two inverters 6m and 6t which are connected to a common low-voltage cable at DC side.

Next, an operation of the power conditioner 2 having the above configuration will be described. The inverter 6m is connected to the feeder 4m, converts the AC power to the DC power and outputs the DC power to a common cable 7. In addition, the inverter 6m can invert the DC power at the common cable 7 side into the AC power and output the AC power to the feeder 4m. In this case, the nickel-metal hydride battery 10 serves to temporarily store the DC power. These operations are implemented by switch elements built into the inverters, as should be well-known. The inverter 6t is operative in the same manner and is capable of performing conversion from the AC power to the DC power and from the DC power to the AC power.

A voltage meter 5m and a voltage meter 5t are attached on the feeders 4m and 4t connected to the inverters 6m and 6t, respectively. Further, a control unit 9 is provided for the inverters 6m and 6t and connected to the voltage meters 5m and 5t. When electric charges are not sufficiently stored in the nickel-metal hydride battery 10, and a voltage of the nickel-metal hydride battery 10 is low, the AC power in the feeders 4m and 4t is converted into the DC power by the rectifying action of the inverters 6m and 6t and charged into the nickel-metal hydride battery 10.

In the power conditioner 2 of this embodiment, when a voltage at the feeder 4m decreases and a state in which "voltage indicated by the voltage meter 5m"<"voltage indicated by the voltage meter 5t" is formed, the control unit 9 controls the switch element built into the inverter 6m so that DC power is inverted into AC power and the AC power is output to the feeder 4m, thereby suppressing a voltage drop at the feeder 4m. In addition, the control unit 9 controls the switch element built into the inverter 6t so that the AC power from the feeder 4t is converted into the DC power to make compensation for a loss of the DC power inverted into the AC power by the inverter 6m.

On the other hand, when a voltage at the feeder 4m increases and a state in which "voltage indicated by the voltage meter 5m">"voltage indicated by the voltage meter 5t" is formed, the control unit 9 controls the switch element built into the inverter 6*m* so that the AC power from the feeder 4*m* is converted into the DC power, thereby mitigating an increase a voltage at the feeder 4*m*. At the same time, the control unit 9 controls the switch element built into the inverter 6*t* so that the DC power rectified by the inverter 6*m* is inverted into the AC power and the AC power is output to the feeder 4*t*.

Similar operation occurs when the voltage decreases or increases at the feeder 4*t*. A hysteresis may be suitably set in a comparison of the voltage indicated by the voltage meter 5*m* and the voltage indicated by the voltage meter 5*t*, to prevent frequent switching.

In the manner as described above, the power conditioner 2 regulates active power in such a manner that it operates so as to eliminate a difference between the voltage at the feeder 4*m* and the voltage at the feeder 4*t*.

The inverters 6*m* and 6*t* regulate reactive power to suppress a voltage fluctuation. That is, the control unit 9 controls the inverters 6*m* and 6*t* to regulate the reactive power generated in the feeders 4*m* and 4*t*. Specifically, when the electric trains 8*m* and 8*t* are consuming the reactive power in a power running mode while running, the inverters 6*m* and 6*t* operate so as to supply the reactive power to the electric trains 8*m* and 8*t*, respectively. This allows the voltage at the feeder 4*m* and the voltage at the feeder 4*t* to be maintained in a proper range.

In the power conditioner 2 according to Embodiment 1 configured as described above, the inverters 6*m* and 6*t* connected to the Main-phase and the Teaser, respectively, make compensation for the reactive power, and these two inverters mutually accommodate ½ of a difference between active power in the Main-phase and active power in the Teaser between these two inverters via the nickel-metal hydride battery 10, thereby equalizing the active power in the Main-phase and the active power in the Teaser. Thus, the power is balanced at the three-phase side.

As described in the technical problem, in a case where the DC capacitor is connected to the inverters (converters), there are problems that a wide space in which the DC capacitor is installed is needed, reliability is not sufficient, and a cost is high. To solve these problems, the inventors of the present invention studied intensively and discovered that the nickel-metal hydride battery has a sufficient capacitance. The inventors discovered that the nickel-metal hydride battery can function adequately as the capacitor, as well as the secondary battery. Accordingly, in the present embodiment, these problems can be solved by disposing the nickel-metal hydride battery 10 between the cables at the DC sides of the inverters 6*m* and 6*t*, instead of the DC capacitor. In other words, unlike the configuration disclosed in Patent Literature 1, the power conditioner 2 is capable of maintaining the feeder voltage by disposing the nickel-metal hydride battery 10 between the cables at the DC sides of the inverters 6*m* and 6*t*, without providing a DC capacitor.

Although cobalt oxyhydroxide is used as a conductive material in the conventional nickel-metal hydride battery, carbon is used as the conductive material in the nickel-metal hydride battery in the present embodiment. Since the carbon constitutes an electrode in this way, the nickel-metal hydride battery in the present embodiment could function as an electric double layer capacitor. For this reason, a large capacitance is attained. Besides, as described later, the nickel-metal hydride battery 10 in the present embodiment is composed of a great quantity of unit batteries. From these facts, the nickel-metal hydride battery 10 of the present embodiment has a very large capacitance and adequately functions as the capacitor.

Since the nickel-metal hydride battery of the present embodiment comprises carbon as the conductive material, to be precise, the battery comprises carbon as a positive electrode conductive material, and the battery is composed of a great quantity of unit batteries, to be precise, the battery has a layer-stacked structure, an equivalent capacitance of the battery is very large.

As should be well known, a capacitance C of a flat-plate electrode is expressed as the following formula (formula 1):

$$C = \in \times S/d \quad \text{(formula 1)}$$

where $\in$ is a dielectric constant, S is an area of the flat-plate electrode, and d is a distance between flat-plate electrodes. S (flat-plate electrode area) may be recognized as being substantially equal to the area of a separator in the nickel-metal hydride battery in the present embodiment. Each of a number of unit batteries constituting the nickel-metal hydride battery as described later includes a pleated separator, and the unit batteries are stacked together. Because of this structure, S (flat-plate electrode area) can be increased easily, and as a result, a large capacitance can be implemented.

It was found out that the capacitance of the nickel-metal hydride battery of the present embodiment is larger than those of other batteries. In a lithium ion battery, charges (ions) required to form a capacitor are not present. $C=Q/V$ (where Q is charge, and V is electric potential). Since the charge Q is extremely small, the capacitance C cannot be large and is substantially zero in the lithium ion battery. Therefore, the capacitance of the lithium ion battery is much smaller than that of the nickel-metal hydride battery of the present embodiment.

In a lead storage battery, an electrode area (S) cannot be increased unlike the nickel-metal hydride battery, and a distance (d) between electrodes is large, because of its structural reason. From this fact, it is presumed that the capacitance of the lead storage battery is 1/10 or less of the capacitance of the nickel-metal hydride battery. It may be said that the capacitance of the lead storage battery is much smaller than the capacitance of the nickel-metal hydride battery of the present embodiment. In contrast, it is true that the electric double layer capacitor has a large capacitance, but has a smaller storage capacity than the battery. For this reason, if the electric double layer capacitor is incorporated into a power conditioner, it is considered that upper limit on active power which the power conditioner can regulate is low.

In light of the above, the inventors of the present invention noted that nickel-metal hydride battery has a large capacitance, and attempted to apply this to an AC feeding system for an electric railway. Other batteries cannot be applied to the AC feeding system in this way.

1.1 Nickel-Metal Hydride Battery

Hereinafter, the nickel-metal hydride battery 10 incorporated into the power conditioner 2 according to Embodiment 1 will be described in greater detail.

The nickel-metal hydride battery 10 is formed by battery module(s) including a plurality of unit batteries connected in series. The nickel-metal hydride battery 10 may be formed by a single battery module or a series battery module including a plurality of battery modules connected in series. Or, the nickel-metal hydride battery 10 may be formed by connecting the single battery modules in parallel or by connecting the series battery modules in parallel. In parallel connection, a battery storage capacity increases and an equivalent internal resistance decreases.

[Exemplary Configuration of Unit Battery]

Figure 2:
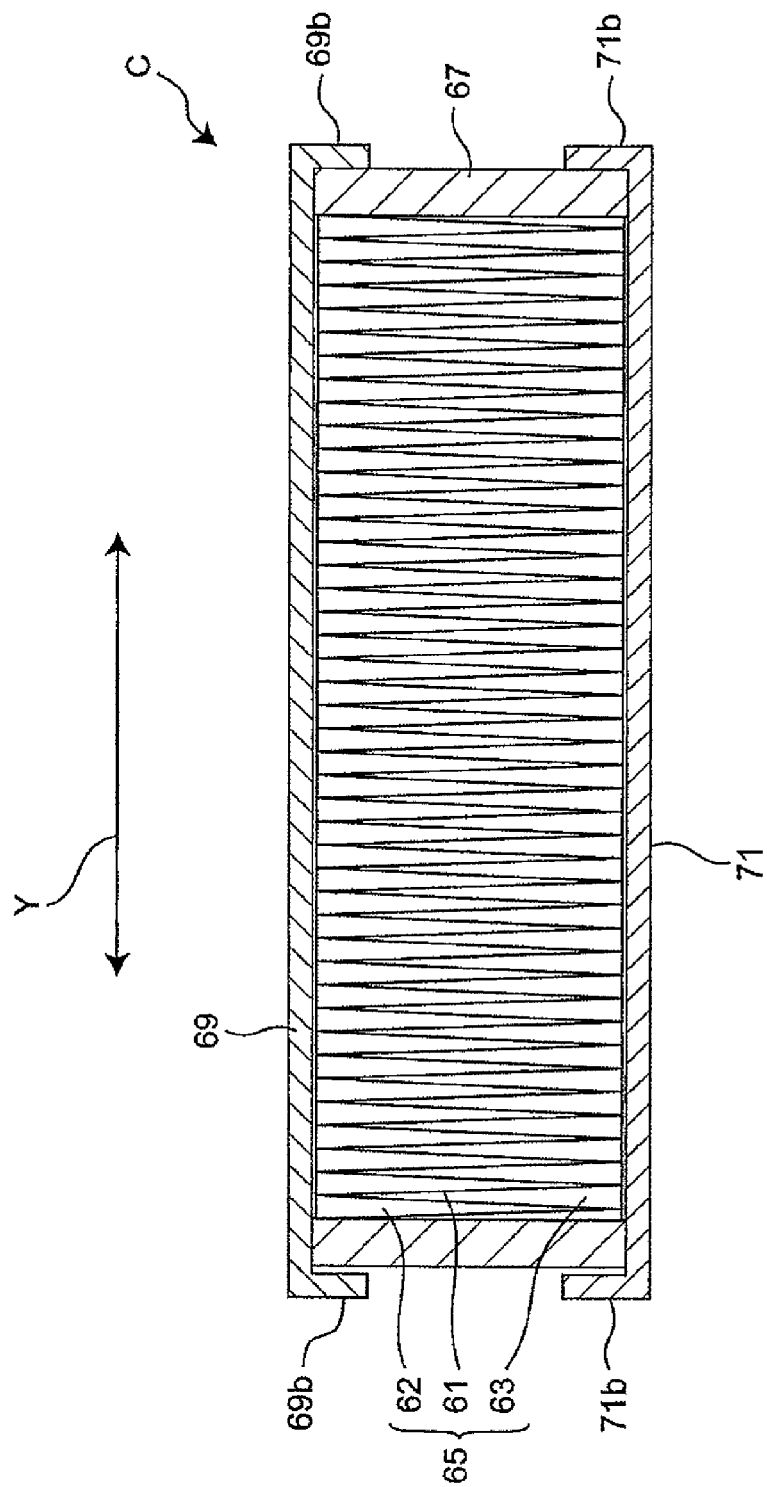
FIG. 2 is a cross-sectional view showing a structure of an exemplary configuration of a unit battery constituting the nickel-metal hydride battery.
Figure 3:
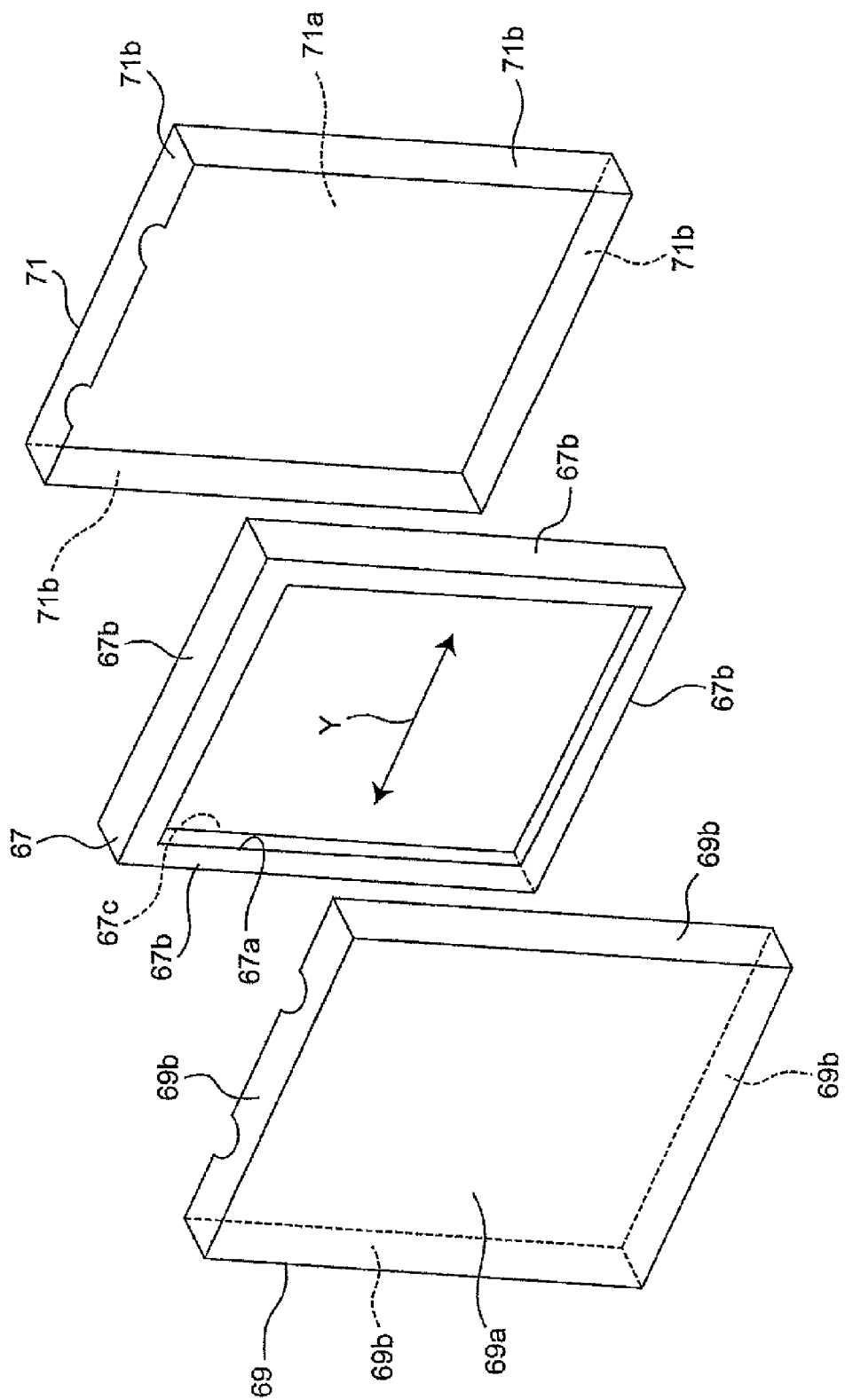
FIG. 3 is a perspective view showing a structure of a frame member, a first lid member and a second lid member of the unit battery of FIG. 2.

FIGS. 2 and 3 are views showing an exemplary configuration of the above described unit battery.

FIG. 2 is a cross-sectional view showing a structure of the unit battery C. The unit battery C includes an electrode component 65 including a separator 61, a positive electrode plate 62 forming a positive electrode, and a negative electrode plate 63 forming a negative electrode, a rectangular frame member 67 defining a space in which the electrode component 65 and an electrolyte solution are accommodated together, a first lid member 69, and a second lid member 71. The unit battery C of FIG. 2 includes nickel hydroxide as a primary positive electrode active material, hydrogen storage alloy as a primary negative electrode active material, and an alkaline aqueous solution as the electrolytic solution, and is configured as a nickel-metal hydride secondary battery which is capable of repeated charging and discharging.

As shown in FIG. 3, the first lid member 69 includes a base portion 69a of a flat-plate shape covering one opening 67a of the frame member 67, and edge portions integral with four sides of the base portion 69a are bent substantially along the four sides 67b of the frame member 67 to form side portions 69b covering a part of a peripheral surface of the frame member 67. Like the first lid member 69, the second lid member 71 has a base portion 71a and side portions 71b and covers the other opening 67c of the frame member 67.

As shown in FIG. 2, the electrode component 65 has a layer-stacked structure in which a positive electrode plate 62 and a negative electrode plate 63 are stacked alternately in a predetermined direction with a separator 61 interposed therebetween. To be more specific, the electrode component 65 has a pleated structure in which the positive electrode plate 62 and the negative electrode plate 63 are stacked alternately such that they are opposite each other with the separator bent in a pleated shape interposed therebetween. In the unit battery C shown in FIGS. 2 and 3, the electrode components 65 are stacked together in a direction Y from one of a pair of sides 67b which are opposite to each other in a rightward and leftward direction, toward the other side.

By incorporating the pleated separators into the unit battery, the area S of the separator is very large, and hence, an overall capacitance of the nickel-metal hydride battery is very large, in the nickel-metal hydride battery comprising a number of unit batteries.

[Exemplary Configuration of Battery Module Comprising Unit Batteries]

FIG. 4A is a transverse sectional view of the exemplary configuration of the battery module composed of the unit batteries, and FIG. 4B is a partial perspective view of the battery module of FIG. 4A, in which an air flow direction inside a heat transfer plate of the battery module is depicted (insulating plates 107 and 108 depicted in FIG. 4A are omitted). FIG. 5 is a perspective view of the heat transfer plate for use in the battery module of FIGS. 4A and 4B.

Figure 4:
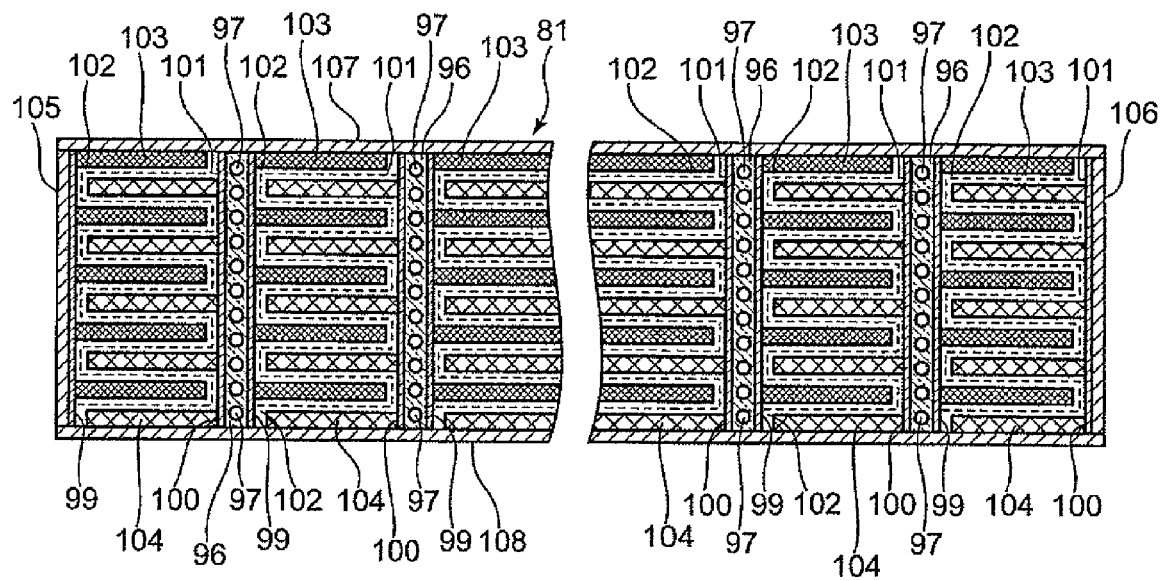
FIG. 4A is a transverse sectional view of an exemplary configuration of a battery module constituted by the unit batteries.
FIG. 4B is a partial perspective view of the battery module in the exemplary configuration, in which an air flow direction inside a heat transfer plate is depicted.
Figure 4:
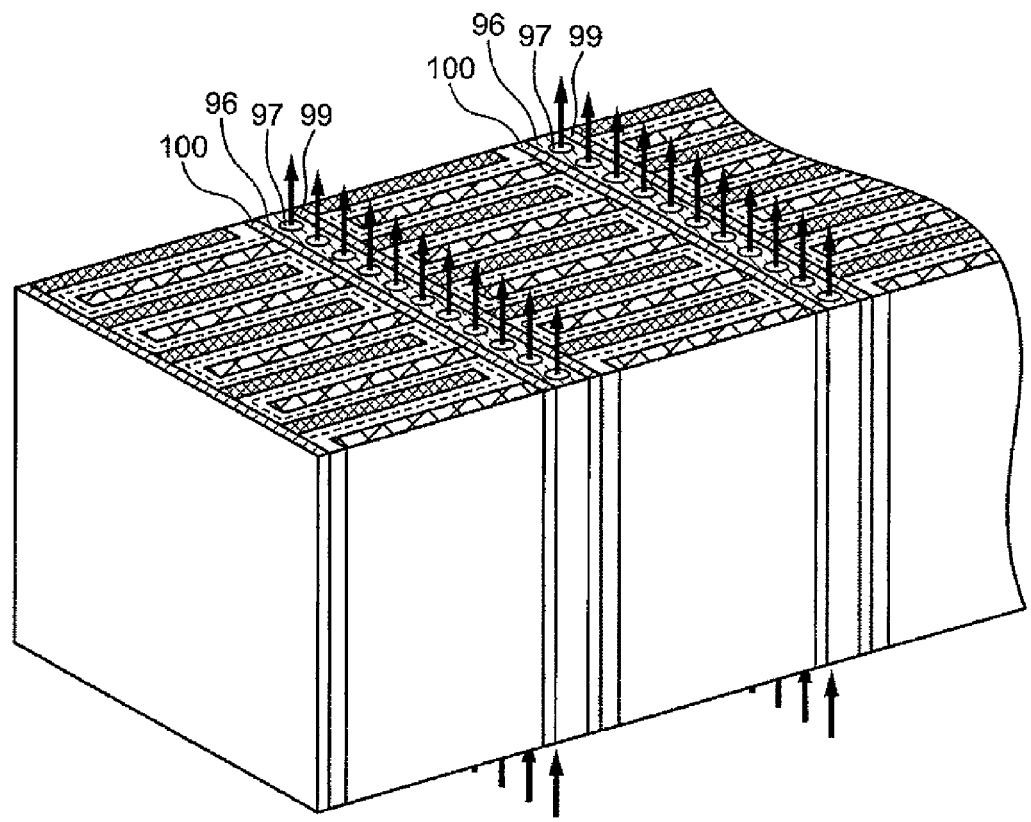
Figure 5:
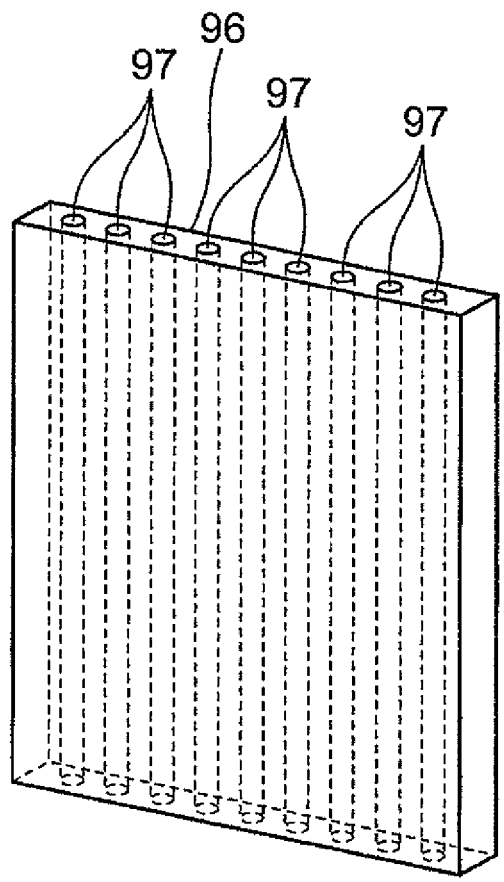
FIG. 5 is a perspective view of the heat transfer plate for use in the battery module in the exemplary configuration.

As shown in FIG. 4, the battery module 81 includes a plurality of unit batteries stacked together, each of which is described above. In respective unit batteries in the exemplary configuration, a bellows-like separator 101 is disposed between a positive electrode current collector 99 and a negative electrode current collector 100 which are opposite to each other such that the portions of the separator 101 are alternately close to portions of these current collectors. The separator 101 is not altered, for example, is corrosion-resistant in an alkaline electrolyte solution, and permits ions to permeate but does not permit electrons to permeate. Further, in the respective unit batteries, an electrolyte solution 102 and a positive electrode sheet 103 containing a positive electrode active material are disposed in a space defined by the bellows-like separator 101 and the positive electrode current collector 99, and the electrolyte solution 102 and a negative electrode sheet 104 containing a negative electrode active material are disposed in a space defined by the bellows-like separator 101 and the negative electrode current collector 100 such that the separator 101 is sandwiched between the positive electrode sheet 103 and the negative electrode sheet 104, and the positive electrode sheet 103 and the negative electrode sheet 104 are incorporated alternately into the unit battery. The bellows-like separator 101 allows the positive electrode sheets 103 and the negative electrode sheets 104 to be stacked into the unit battery having a numbers of cells. This allows the unit batteries to have a larger capacitance. In addition, this makes it possible to increase an electrode area and connect adjacent cells to each other with a very low resistance. Therefore, a cable for connecting the cells may be omitted. As a result, an overall battery can be made compact.

The positive electrode sheet 103 is in contact with the positive electrode current collector 99, while the negative electrode sheet 104 is in contact with the negative electrode current collector 100. Between adjacent two unit batteries, the heat transfer plate 96 shown in FIG. 5 is interposed in contact with the positive electrode current collector 99 of one unit battery and the negative electrode current collector 100 of another unit battery. The direction in which air holes 97 extend in the heat transfer plate 96 is a vertical direction of the positive electrode sheet 103 and the negative electrode sheet 104. In respective unit batteries, a region between the positive electrode current collector 99 and the negative electrode current collector 100 is divided into a positive electrode cell and a negative electrode cell by the separator 101. The positive electrode cell is a region which is defined by the separator 101 and the positive electrode current collector 99 and in which the positive electrode sheet 103 is disposed, while the negative electrode cell is a region which is defined by the separator 101 and the negative electrode current collector 100 and in which the negative electrode sheet 104 is disposed.

As shown in FIG. 4A, the positive electrode current collector 99 and the negative electrode current collector 100 each made of metal having high electric conductivity and high heat conductivity are directly in contact with the positive electrode sheet 103 and the negative electrode sheet 104, respectively. In addition, the current collectors 99 and 100 are in contact with the heat transfer plate 96 which serves to electrically connect the positive electrode current collector 99 to the negative electrode current collector 100. In this structure, along the direction indicated by arrows of FIG. 4B, heat generated through a battery reaction is transferred efficiently and released to outside by the air flowing through the air holes 97 of the heat transfer plates 96. In this way, the temperature of the battery module 81 can be maintained in a proper range within which a battery reaction proceeds smoothly.

As shown in FIG. 4A, an overall positive electrode current collector 105 is provided at an end portion of the positive electrode, while an overall negative electrode current collector 106 is provided at an end portion of the negative electrode. Insulating plates 107 and 108 are provided at side portions of the battery module 81, respectively. A connection positive electrode terminal (not shown) is attached to the center portion of the overall positive electrode current collector 105, while a connection negative electrode terminal (not shown) is attached to the center portion of the overall negative electrode current collector 106.

The positive electrode sheet 103 is formed by applying onto a substrate, for example, a paste comprising a positive electrode active material, a conductive filler and a resin which are mixed in a solvent, to produce a plate shape, and to cure it. The negative electrode sheet 104 is formed by applying onto a substrate, for example, a paste comprising a negative electrode active material, a conductive filler and resin which are mixed in a solvent, to produce a plate shape, and to cure it. As the positive electrode active material and the negative electrode active material, all known active materials may be used. As the conductive filler, carbon fibers, nickel-plated carbon fibers, carbon particles, nickel-plated carbon particles, nickel-plated organic fibers, fibrous nickel, nickel particles, or a nickel foil, may be used singly or in combination. As the resin, thermoplastic resin with a softening temperature of 120 degrees C. or lower, resin with a curing temperature in a range from a room temperature to 120 degrees C., resin dissolvable into a solvent with an evaporating temperature of 120 degrees C. or lower, resin dissolvable into a solvent dissolvable into water, or resin dissolvable into a solvent dissolvable into alcohol, may be used. As the substrate, a metal plate having electric conductivity, such as a nickel plate may be used.

The heat transfer plate 96 is formed by nickel-plating an aluminum-made base. A number of air holes 97 as air flow passages vertically penetrate the heat transfer plate 96. The heat transfer plate 96 is interposed between the positive electrode current collector 99 and the negative electrode current collector 100 and allows air suctioned by a suction fan (not shown) to flow through the air holes 97. The heat transfer plate 96 is a member which is in contact with the positive electrode current collector 99 and the negative electrode current collector 100 to electrically connect the positive electrode current collector 99 and the negative electrode current collector 100 to each other and has heat electric conductivity. Aluminum has a favorable property for use as the heat transfer plate 96 because it is relatively low in electric resistance and relatively high in heat conductivity, but has a drawback that it is easily oxidized. In light of this, a nickel-plated aluminum plate is more preferable for use as the heat transfer plate 96 because nickel-plating not only suppresses oxidization but also lowers a contact resistance.

[Electromotive Force and Capacitance of Nickel-Metal Hydride Battery]

Now, specific numeric values of the electromotive force and capacitance of the nickel-metal hydride battery 10 used in the present embodiment, preferably, layer-stacked nickel-metal hydride battery will be studied. In the power conditioner of the present embodiment, nickel-metal hydride battery may be configured in various ways. For example, 19 battery modules each including 30 unit batteries are connected in series to form a serial battery module, and two rows of the serial battery modules are arranged in parallel. Exemplary numeric values of standard performance of the unit battery are, for example, an electromotive force of 1.25V, a battery capacity of 150 Ah, a capacitance 130 F/Ah per unit cell capacity, etc.

In this case, the electromotive force of the nickel-metal hydride battery is 1.25×30×19=712.5V. The capacitance of the nickel-metal hydride battery is 2×130×150/(30×19) =about 68 farad. As should be understood from this, the nickel-metal hydride battery incorporated into the power conditioner of the present embodiment has a very large capacitance.

As described above, it was found out an equivalent capacitance of the nickel-metal hydride battery 10 of the present embodiment is very large. By applying the nickel-metal hydride battery 10 to the AC feeding system, a DC capacitor which requires a wide installation space may be omitted.

1.2. Modified Example of Embodiment 1

Figure 6:
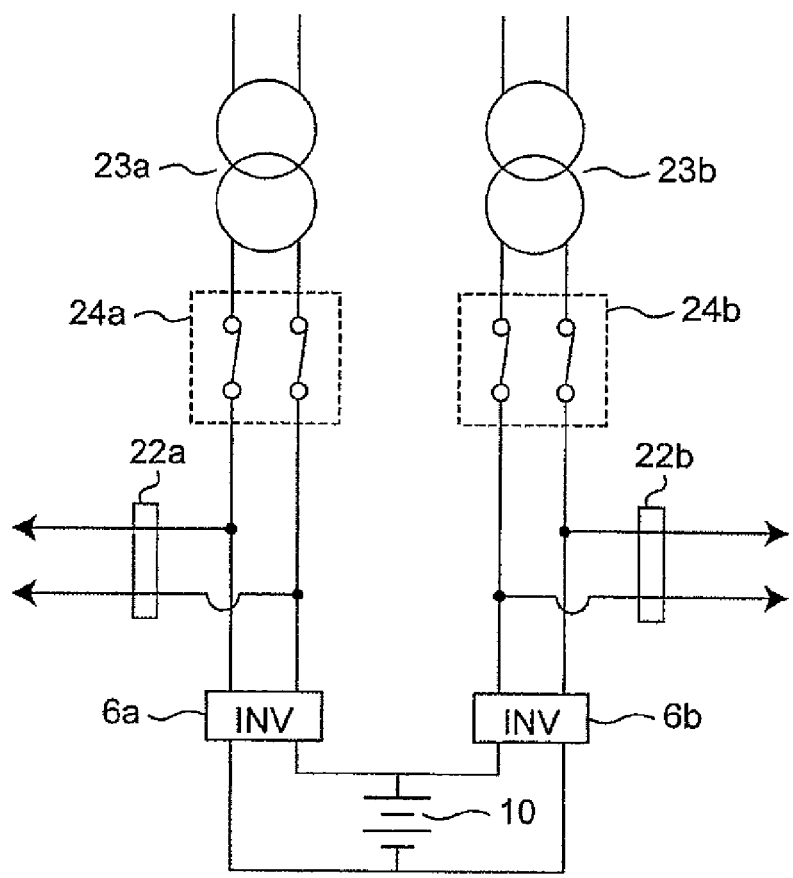
FIG. 6A is a connection diagram of the power conditioner according to Embodiment 1 of the present invention, which is installed at a feeding side in an AC feeding circuit connected to two transformers for receiving single-phase AC power.
FIG. 6B is a conventional art example of a feeding circuit connected to two transformers which receive single-phase AC power.
Figure 6:
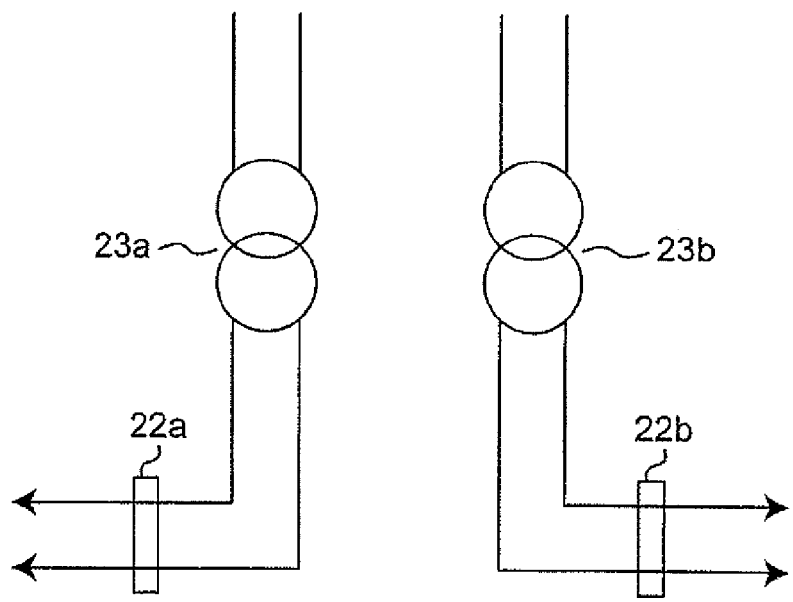

The power conditioner of FIG. 1 is the SVC installed at the feeding side in the Scott-T transformer which receives three-phase AC power. The power conditioner of Embodiment 1 can be installed in a transformer which receives single-phase AC power. FIG. 6A is a connection diagram of the power conditioner according to Embodiment 1 of the present invention, which is installed at a feeding side in an AC feeding circuit connected to two transformers 23a and 23b which receive single-phase AC power. FIG. 6B is a connection diagram of a comparative example of the AC feeding circuit connected to the two transformers 23a and 23b which receive single-phase AC power.

In the power conditioner of FIG. 6A, feeders are provided with breakers 22a and 22b which can interrupt power from the transformers 23a and 23b, respectively. A switch 24a is provided between the transformer 23a and the inverter 6a, while a switch 24b is provided between the transformer 23b and the inverter 6b. The operation of the switches 24a and 24b will be discussed in "4. Application example of the present invention."

As shown in FIG. 6A, by connecting the power conditioner of Embodiment 1 to the two transformers 23a and 23b which receive single-phase AC power, a DC capacitor may be omitted. The single-phase AC power may be two-wire or three-wire AC power. The power conditioner of the present embodiment may be applied to a configuration in which two single-phase transformers V-connected receive three-phase AC power and feed the AC power to respective directions.

2. Embodiment 2

Figure 7:
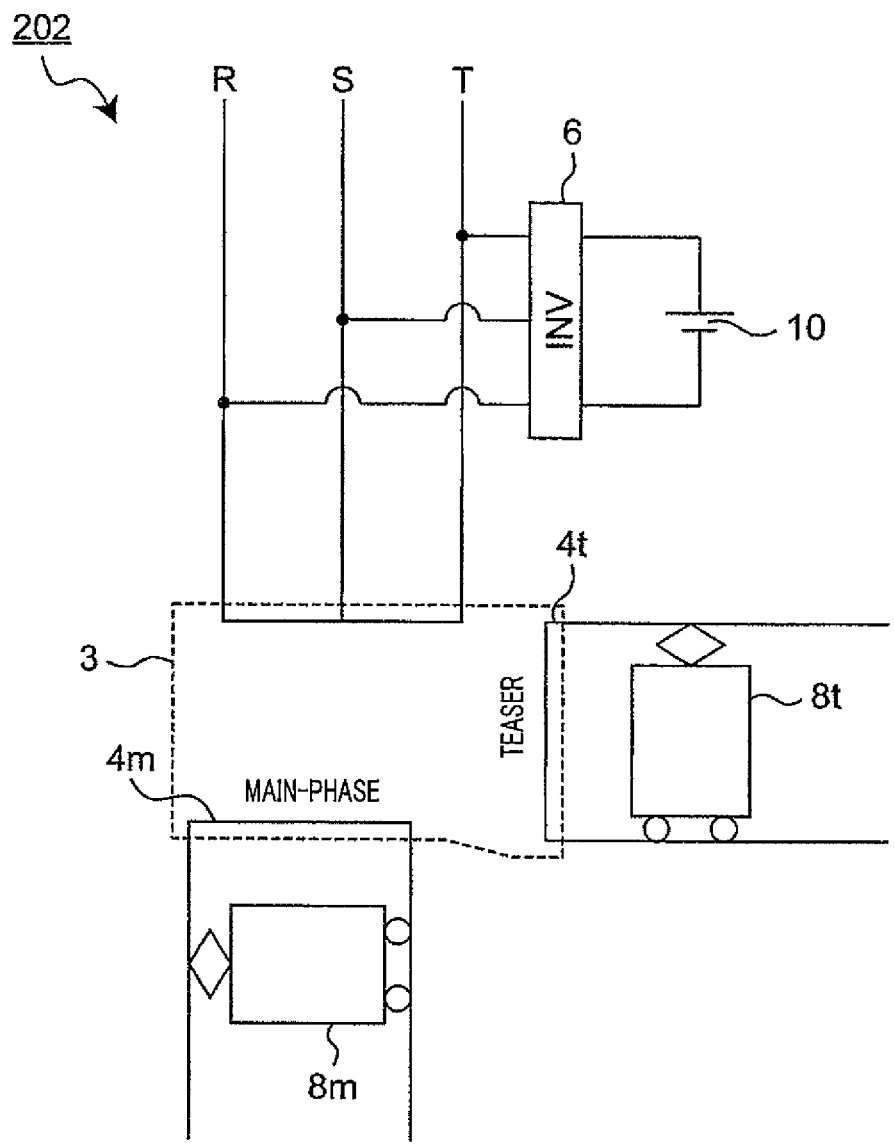
FIG. 7 is a connection diagram of a power conditioner according to Embodiment 2 of the present invention.

FIG. 7 is a connection diagram of a power conditioner 202 according to Embodiment 2 of the present invention. The power conditioner 202 according to Embodiment 2 constitutes a three-phase SVC installed at receiving side (three-phase side) in the Scott-T transformer 3 in an AC traction substation. R-phase, S-phase, and T-phase indicate inputs at three-phase side in the Scott-T transformer 3, respectively. Main-phase and Teaser indicate two single-phase powers formed at the feeding side in the Scott-T transformer 3, respectively. The SVC 202 of Embodiment 2 includes an inverter 6 connected at its AC side to three-phase inputs, respectively, and the nickel-metal hydride battery 10 connected to DC side in the inverter 6.

The inverter 6 is similar to the inverter according to the above conventional art. The nickel-metal hydride battery 10 is disposed between and connected to a DC input/output end of the inverter 6 which is connected to a high-voltage cable at the DC side and to a DC input/output end of the inverter 6 which is connected to a low-voltage cable at the DC side.

In the power conditioner 202 of Embodiment 2, the nickel-metal hydride battery 10 is connected to the inverter 6 installed at the three-phase side, to make compensation for the reactive power and regulate the active power. This makes it possible to omit a DC capacitor.

Since the nickel-metal hydride battery 10 has a large capacitance and adequately functions as a capacitor, unlike the configuration disclosed in Patent Literature 1, the power conditioner 202 of the present embodiment is capable of maintaining a desired voltage at the three-phase side without providing a DC capacitor.

3. Embodiment 3

Figure 8:
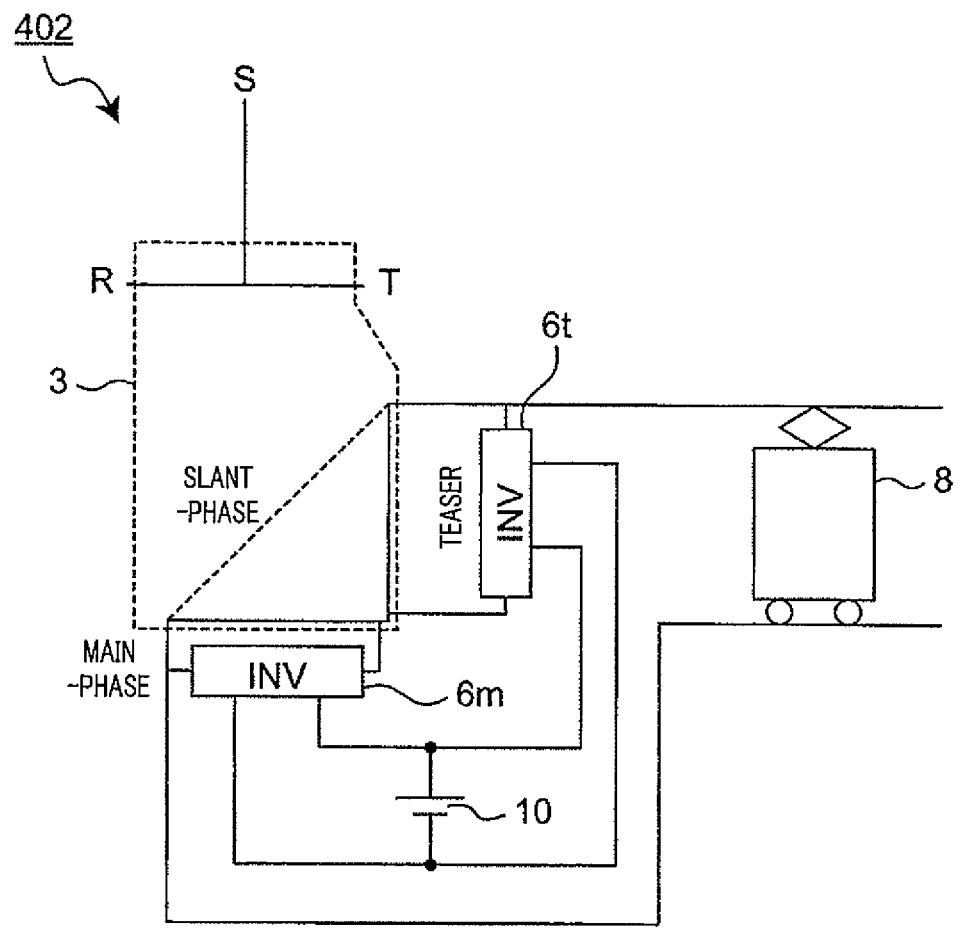
FIG. 8 is a connection diagram of a power conditioner according to Embodiment 3 of the present invention.

FIG. 8 is a connection diagram of a power conditioner 402 according to Embodiment 3 of the present invention. The power conditioner 402 according to Embodiment 3 constitutes a single-phase feeding power conditioner (SFC). The single-phase feeding power conditioner (SFC) is configured such that inverters 6m and 6t are installed at Main-phase and Teaser in a scalene Scott-T transformer which performs single-phase feeding by a Slant-phase formed by directly connecting the Main-phase and the Teaser in the Scott-T transformer 3, and these two inverters 6m and 6t are connected to each other.

In FIG. 8, R-phase, S-phase, and T-phase indicate inputs at three-phase side in the Scott-T transformer, 3 respectively. Main-phase and Teaser indicate two phases formed by the Scott-T transformer 3, respectively. The power conditioner 402 according to Embodiment 3 includes the inverters 6m and 6t connected to the Main-phase and the Teaser, respectively, and the nickel-metal hydride battery 10 connected to the inverters 6m and 6t. The inverters 6m and 6t are similar to those in the power conditioner of according to the above conventional art.

In the power conditioner 402 of Embodiment 3, the nickel-metal hydride battery 10 is connected to the inverters 6m and 6t provided at the Main-phase and the Teaser, respectively, to make compensation for reactive power and regulate the active power. This makes it possible to omit a DC capacitor.

Since the nickel-metal hydride battery 10 has a large capacitance and adequately functions as a capacitor, unlike the configuration disclosed in Patent Literature 1, the power conditioner 402 of the present embodiment is capable of maintaining a voltage at the feeder without providing the DC capacitor.

4. Application Example of the Present Invention

Subsequently, application examples of the present invention will be described.

Figure 12:
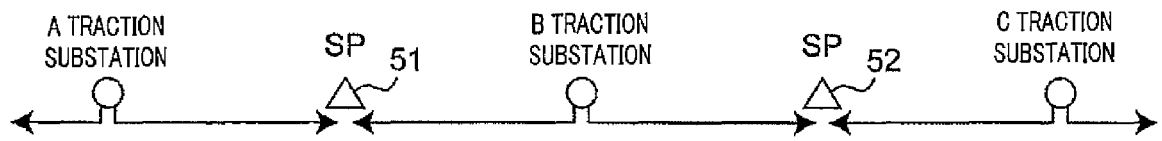
FIG. 12A is a schematic view of an AC feeding circuit including A traction substation, B traction substation, C traction substation, and two sectioning posts (SP).
FIG. 12B is a schematic view of the AC feeding circuit of FIG. 12A when a failure in which receiving power is interrupted occurs in the B traction substation.
FIG. 12C is a connection diagram of a conventional SVC included in the traction substation of FIG. 12A.
Figure 12:
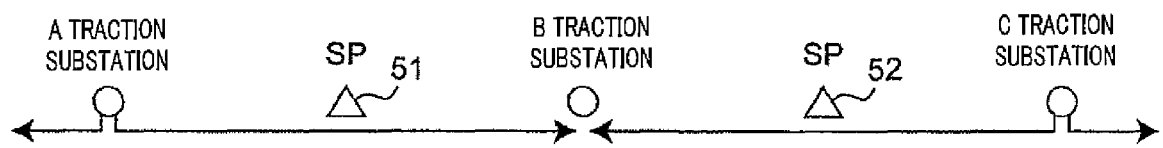
Figure 12C:
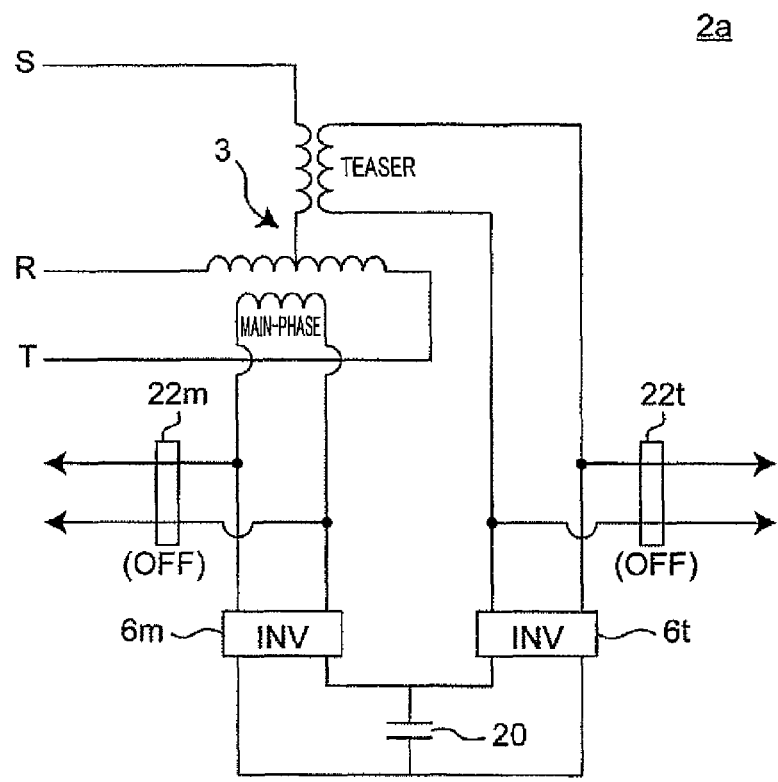

FIG. 12A is a schematic view of an AC feeding circuit including A traction substation, B traction substation, C traction substation, and two sectioning posts (SP) 51 and 52. It is assumed that each traction substation includes railway static power conditioner (RPC) 2a which is the conventional SVC. FIG. 12B is a schematic view of the AC feeding circuit including A traction substation, B traction substation, C traction substation, and two sectioning posts (SP) 51 and 52, when a failure in which receiving power is interrupted occurs in the B traction substation in the AC feeding circuit of FIG. 12A. FIG. 12C is a connection diagram of a conventional RPC 2a, showing a state in which a failure in which receiving power is interrupted occurs in a traction substation.

Firstly, it is assumed that a failure in which receiving power is interrupted occurs in the B traction substation in the AC feeding circuit shown in FIG. 12A. Because of this, a connection state in the AC feeding circuit is changed into one shown in FIG. 12B. That is, as shown in FIG. 12B, the sectioning post 51 between the A traction substation and the B traction substation electrically connects a section from the A traction substation to the sectioning post 51 to a section from the sectioning post 51 to the B traction substation and the electric train continues to run in a state where a section from the A traction substation to the B traction substation is one relief feeding section. In this case, the relief feeding section is supplied with electric power only from the A traction substation.

Likewise, the sectioning post 52 between the B traction substation and the C traction substation, electrically connects a section from the B traction substation to the sectioning post 52 to a section from the sectioning post 52 to the C traction substation, and the electric train continues to run in a state where a section from the B traction substation to the C traction substation is one relief feeding section. In this case, the relief feeding section is supplied with electric power only from the C traction substation.

Conventionally, in the AC feeding circuit, when a failure in which receiving power is interrupted occurs in the B traction substation, breakers 22m and 22t provided between the B traction substation and the feeders are activated to interrupt the electric power, as shown in FIG. 12C. As a result, the electric train can run in a section between the A traction substation and the B traction substation and in a section between the B traction substation and the C traction substation, but its running speed is significantly limited, because the supplied power is reduced by half.

Figure 9:
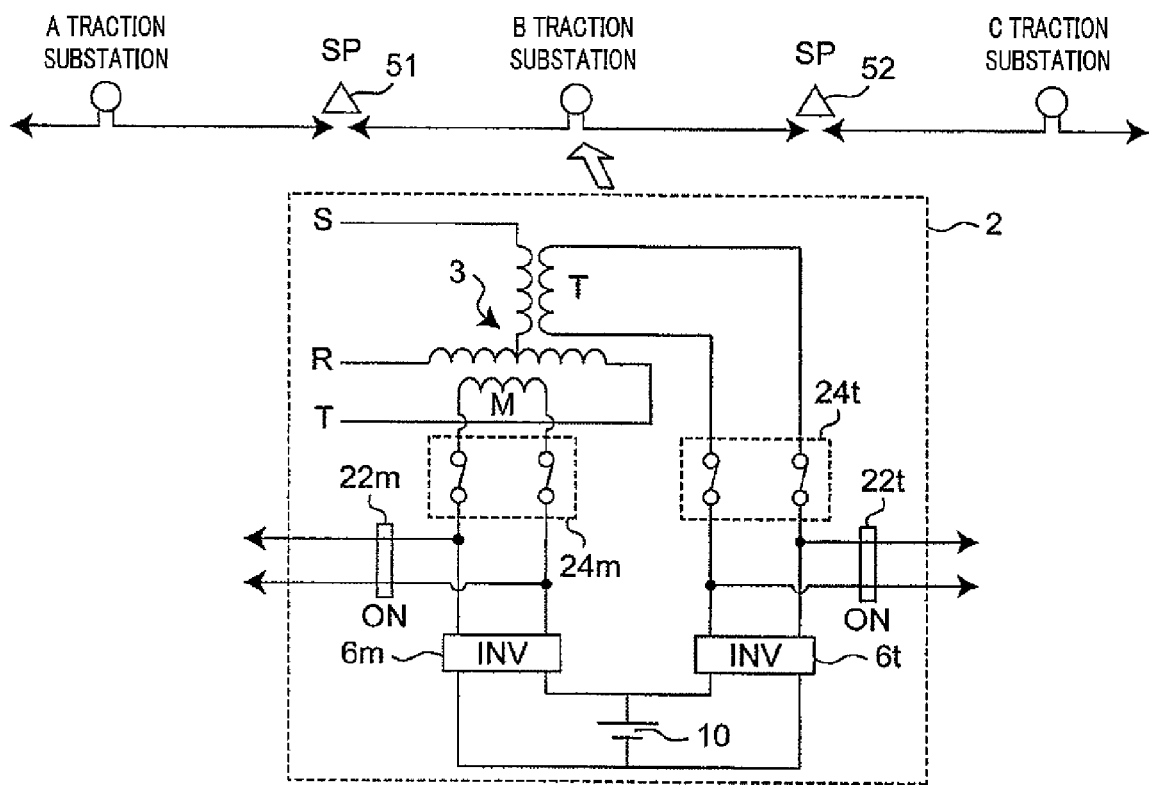
FIG. 9A and FIG. 9B show an AC feeding circuit including an exemplary application of a power conditioner for addressing a problem associated with speed limitation when a failure occurs in a traction substation.
Figure 9:
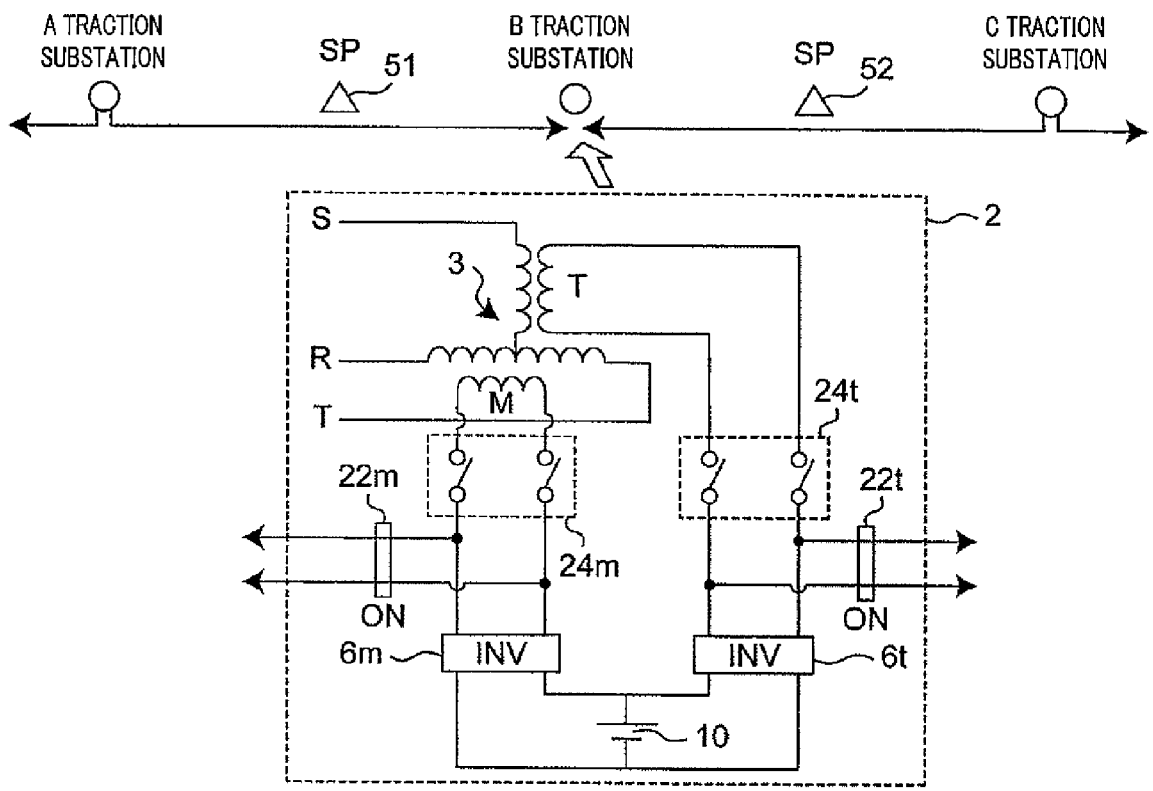

FIG. 9 shows an AC feeding circuit including an exemplary application of a power conditioner of the present invention. The AC feeding circuit addresses a problem associated with speed limitation when a failure occurs in a traction substation in the conventional AC feeding circuit. An upper part of FIG. 9A shows a schematic representation of the AC feeding circuit including A traction substation, B traction substation, C traction substation, and two sectioning posts (SP) 51 and 52, and a lower part of FIG. 9A shows a connection diagram of the power conditioner of the present invention which is included in each traction substation. The power conditioner is identical to the railway static power conditioner (RPC) of FIG. 1. The power conditioner includes the nickel-metal hydride battery 10 instead of the capacitor 20 interposed between the cables at the DC sides of the inverters 6m and 6t connected to the Main-phase and the Teaser, respectively, in the configuration of FIG. 12C. The power conditioner of FIG. 9 includes switches 24m and 24t in addition to the breakers 22m and 22t.

An upper part of FIG. 9B shows a connection state of feeding sections when a failure in which receiving power is interrupted occurs in the B traction substation in the AC feeding circuit of FIG. 9A. As depicted at the upper part of FIG. 9B, the sectioning post 51 between the A traction substation and the B traction substation electrically connects a section from the A traction substation to the sectioning post 51 to a section from the sectioning post 51 to the B traction substation. The sectioning post 52 between the B traction substation and the C traction substation electrically connects a section from the B traction substation to the sectioning post 52 to a section from the sectioning post 52 to the C traction substation.

A lower part of FIG. 9B shows a state of the power conditioner when a failure in which receiving power is interrupted occurs in the B traction substation. In the power conditioner depicted at the lower part of FIG. 9B, the switches 24m and 24t are OFF, but the breakers 22m and 22t are not activated (i.e., power is supplied). Therefore, the right feeding section and the left feeding section of the B traction substation are connected to each other with the power conditioner interposed therebetween, and are supplied with the power from the nickel-metal hydride battery 10. Thus, a section from the A traction substation to the B traction substation and a section from the B traction substation to the C traction substation are relief feeding sections by establishing connection of the sectioning posts 51 and 52. Further, the A traction substation and the C traction substation are put in an electrically-parallel feeding state, and as a result, the electric car running in the relief feeding sections can continue normal running.

5. Application to Sectioning Post

Figure 10:
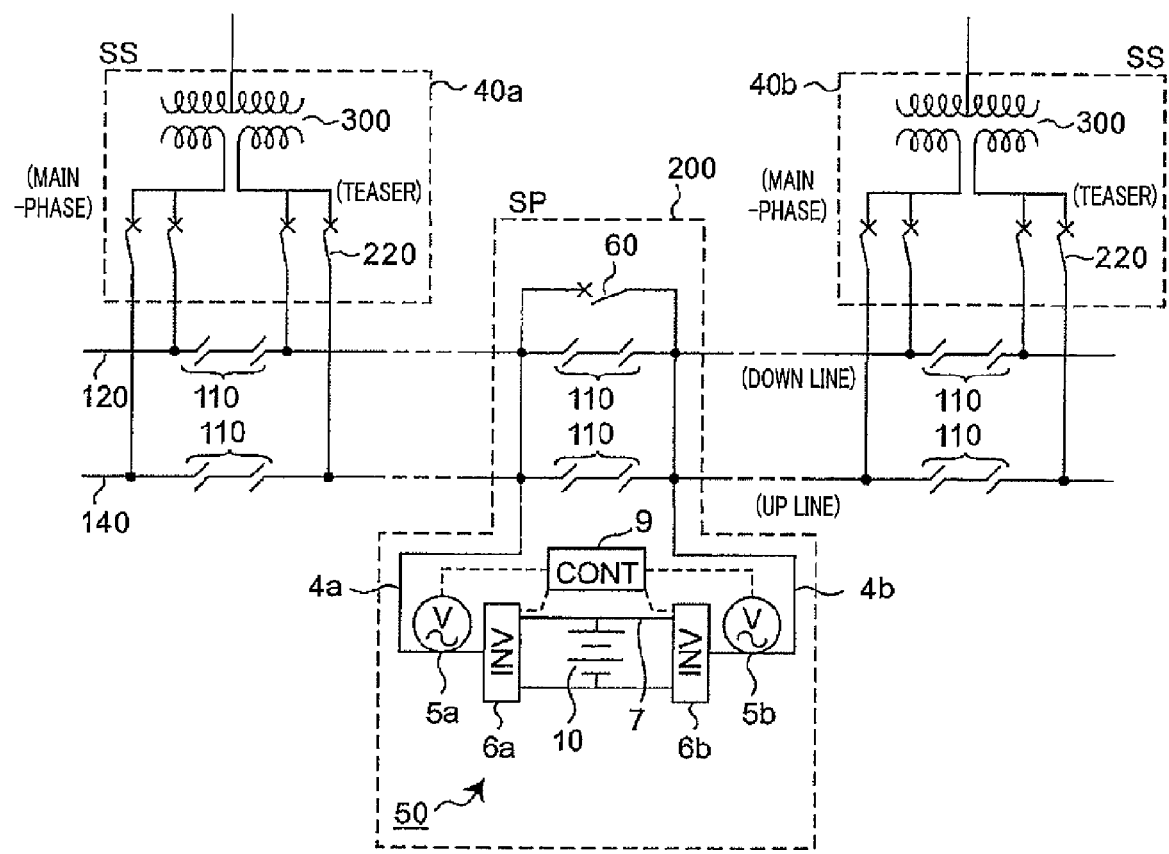
FIG. 10 is a view of a configuration of an AC feeding circuit including an AC feeding apparatus to which the power conditioner of the present invention is applied.
Figure 11:
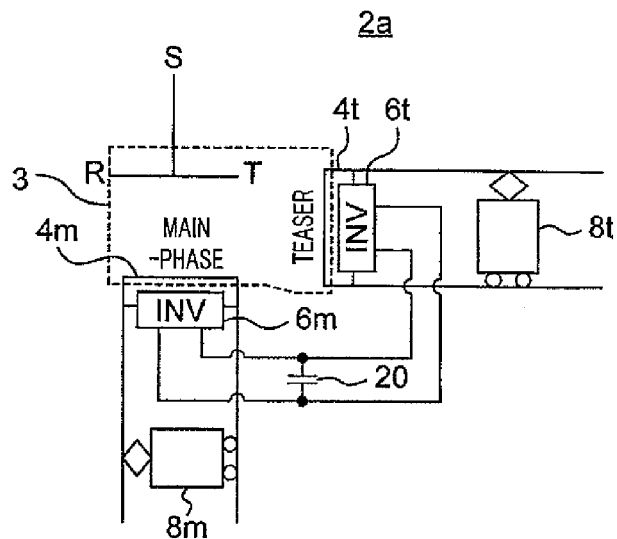
FIG. 11A is a connection diagram of a railway static power conditioner (RPC) installed at a feeding side in a Scott-T transformer in the AC traction substation.
FIG. 11B is a connection diagram of a three-phase SVC installed at three-phase side in the Scott-T transformer.
FIG. 11C is a connection diagram of a single-phase feeding power conditioner (SFC) in which, in a scalene Scott-T transformer in which Main-phase and Teaser in Scott-T transformer are directly connected to each other and single-phase feeding is performed by a Slant-phase, inverters are disposed in the Main-phase and the Teaser, respectively and these two inverters are connected to each other.
Figure 11:
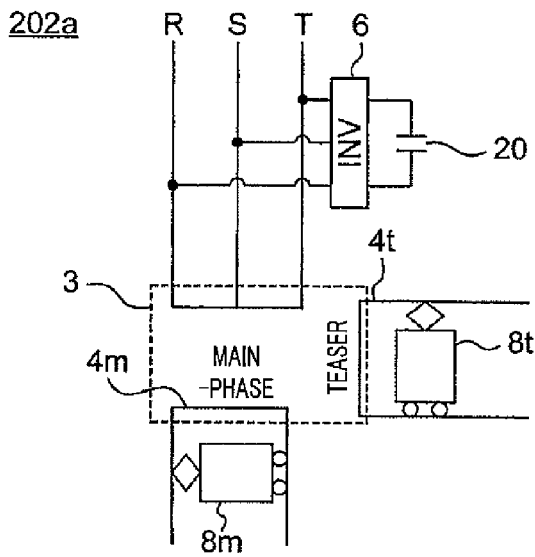
Figure 11C:
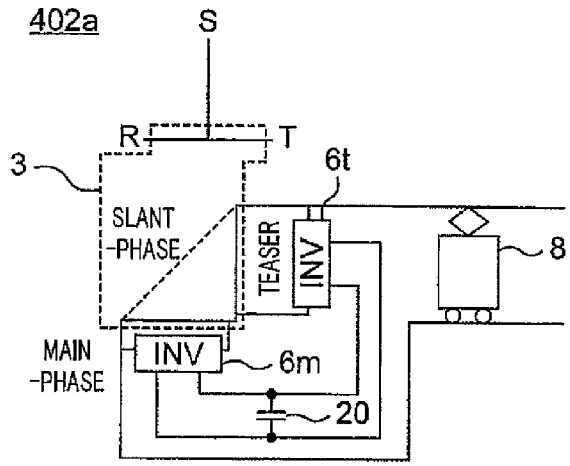

The power conditioner of the present invention is applicable to sectioning posts. FIG. 10 is a view of a configuration of an AC feeding circuit including an AC feeding apparatus 50 to which the power conditioner of the present invention is applied. The AC feeding circuit of FIG. 10 includes a down line 120 and an up line 140. Further, the AC feeding circuit of FIG. 10 includes traction substations (SS) 40a and 40b and a sectioning post (SP) 200 for sectioning feeding. These are actually provided along an electric railway line. A dead section 110 is provided between right and left feeding circuits with respect to the traction substation (SS) 40a, and with respect to the traction substation (SS) 40b. A section between the traction substation (SS) 40a and the sectioning post (SP) 200 and a section between the traction substation (SS) 40b and the sectioning post (SP) 200 are called "feeding sections". The configuration of FIG. 10 is a part of the AC feeding circuit and more traction substations (SS) 40a, and 40b and more sectioning posts (SP) 200 may be provided.

Each of the traction substations (SS) 40a and 40b includes a three-phase to two-phase transformer 300 and outputs two-phase electric powers of the Main-phase and the Teaser to the right and left feeding circuits, respectively. During normal running, the breaker 220 provided in each of the Main-phase and the Teaser is not activated but a circuit is closed. When a failure occurs in the traction substation (SS) 40a or 40b, or a feeding system, the breaker 220 is activated to open the circuit.

The sectioning post (SP) 200 includes a breaker 60. The breaker 60 is normally open. If a failure occurs in either one of the left traction substation (SS) 40a and the right traction substation (SS) 40b of the sectioning post 200, and thereby power feeding from the left traction substation (SS) 40a or the right traction substation (SS) 40b is interrupted, the breaker 60 is closed, and the power is fed from the left traction substation (SS) 40a or the right traction substation (SS) 40b in which no failure occurs, to a feeding section to which the left traction substation (SS) 40a or the right traction substation (SS) 40b in which the failure occurs, is allocated, beyond the sectioning post (SP) 200.

As shown in FIG. 10, the AC feeding apparatus 50 disposed in the sectioning post (SP) 200 of the present embodiment, includes two inverters (AC-DC and DC-AC converters) 6a and 6b which convert AC power in a feeding circuit to DC power and invert the DC power to the AC power, and the nickel-metal hydride battery 10 disposed between and connected to a high-voltage (positive) cable and a low-voltage (negative) cable at DC sides of the two inverters (AC-DC and DC-AC converters) 6a and 6b. That is, the nickel-metal hydride battery 10 is disposed between and connected to DC input/output ends of the inverters 6a and 6b which are connected to a common high-voltage (positive) cable at DC side and DC input/output ends of the inverters 6a and 6b which are connected to a common low-voltage (negative) cable at DC side.

The inverter 6a is connected at its AC side to an AC cable 4a connected to an overhead line, converts the AC power to the DC power, and outputs the DC power to a common cable (common high-voltage cable and common low-voltage cable) 7. The inverter 6a is also capable of inverting the DC power at the common cable 7 at the DC side into the AC power and outputting the AC power to the AC cable 4a. In this case, as described above, the nickel-metal hydride battery 10 functions as a capacitor as well as a secondary battery. These functions are implemented by switch elements built into the inverter, as should be well known. The inverter 6b functions in the same manner and is capable of converting the AC power to the DC power and converting the DC power to the AC power.

A voltage meter 5a and a voltage meter 5b are attached on the AC cables 4a and 4b connected to the inverters 6a and 6b, respectively. Further, a control unit 9 is provided for the inverters 6a and 6b and connected to the voltage meters 5a and 5b. When electric charges are not sufficiently stored in the nickel-metal hydride battery 10, and a voltage of the nickel-metal hydride battery 10 is low, the AC power in the AC cables 4a and 4b is converted into the DC power by the rectifying action of the inverters 6a and 6b, and charged into the nickel-metal hydride battery 10.

In the AC feeding apparatus 50 of the present embodiment, when a voltage at the AC cable 4a decreases and a state in which "voltage indicated by the voltage meter 5a"<"voltage indicated by the voltage meter 5b" is formed, the control unit 9 controls the switch element built into the inverter 6a so that the DC power is inverted into the AC power and the AC power is output to the AC cable 4a, thereby suppressing a drop of the voltage at the AC cable 4a. In addition, the control unit 9 controls the switch element built into the inverter 6b so that the AC power from the AC cable 4b is converted into the DC power to make compensation for a loss of the DC power inverted into the AC power by the inverter 6a.

On the other hand, when a voltage at the AC cable 4a increases and a state in which "voltage indicated by the voltage meter 5a">"voltage indicated by the voltage meter 5b" is formed, the control unit 9 controls the switch element built into the inverter 6a so that the AC power from the AC cable 4a is converted into the DC power, thereby mitigating an increase in a voltage at the AC cable 4a. At the same time, the control unit 9 controls the switch element built into the inverter 6b so that the DC power rectified by the inverter 6a is inverted into the AC power and the AC power is output to the AC cable 4b.

Similar operation occurs when the voltage decreases or increases in the AC cable 4b. A hysteresis may be suitably set in a comparison of the voltage indicated by the voltage meter 5a and the voltage indicated by the voltage meter 5b, to prevent frequent switching.

In the manner as described above, the AC feeding apparatus 50 operates so as to eliminate a difference between the voltage at the AC cable 4a and the voltage at the AC cable 4b.

As compared to the conventional AC feeding apparatus including the capacitor instead of the nickel-metal hydride battery 10, the nickel-metal hydride battery 10 of the present embodiment is capable of storing a huge quantity of electric charges because it is a secondary battery. Since a larger quantity of electric power from the AC cable 4a can be stored in the nickel-metal hydride battery 10, an ability to absorb regenerative electric power is high.

In the AC feeding apparatus 50 of the present embodiment, if high electric power becomes necessary for a moment (e.g., by power running of the electric train) within either one of the right and left feeding sections of the sectioning posts (SP) 200, the voltage at that feeding section becomes lower than the voltage at the other feeding section. Thereupon, as described above, the inverters 6a and 6b operate to cause electric power to flow to the feeding section where the voltage is lower from the other feeding section. This prevents a voltage drop at the overhead line in the feeding section which requires electric power.

In a case where regenerative electric power is generated within either one of the right and left feeding sections of the sectioning posts (SP) 200, the voltage at that feeding section becomes higher. Thereupon, as described above, the inverters 6a and 6b operate so that most of the electric power in the feeding section where the voltage is higher is stored into the nickel-metal hydride battery 10, and a part of the electric power flows to the other feeding section. This prevents a voltage rise at the overhead line in the feeding section where regenerative electric power is generated. Furthermore, since the generated regenerative electric power can be stored in the nickel-metal hydride battery 10, the regenerative electric power can be efficiently utilized without wasting it. In addition, since the ability to absorb the regenerative electric power is high, it is possible to prevent cancellation of regeneration.

That is, by using the inverters 6a and 6b and the nickel-metal hydride battery 10, the electric power from the two traction substations (SS) 40a and 40b with different phases can be fed to the feeding section in parallel.

For example, it is assumed that in the example shown in FIG. 10, an electric train is running in a state of acceleration just at the left side in the sectioning post (SP) in the feeding section between the left traction substation (SS) 40*a* and the sectioning post (SP) 200. This electric train being accelerated can receive electric power required for the acceleration from both the left traction substation (SS) 40*a* and the right traction substation (SS) 40*b*. In other words, in the present embodiment, dependency on the electric power from the left traction substation (SS) 40*a* is reduced by about ½. Therefore, a load is made uniform between the traction substations, thereby mitigating a voltage drop at the feeding section where a vehicle is running in a state of acceleration.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

REFERENCE SIGNS LISTS 2, 202, 402 . . . power conditioner
3 . . . Scott-T transformer
4*m*, 4*t* . . . feeder
4*m*, 5*t* . . . voltage meter
6, 6*m*, 6*t*, 6*a*, 6*b* . . . inverter
7 . . . common cable
8, 8*m*, 8*t* . . . electric train
9 . . . control unit
10 . . . nickel-metal hydride battery
22*a*, 22*b*, 22*m*, 22*t* . . . breaker
23*a*, 23*b* . . . transformer
24*a*, 24*b*, 24*m*, 24*t* . . . switch
51, 52 . . . sectioning post (SP)
65 . . . electrode component
67 . . . frame member
69 . . . first lid member
72 . . . second lid member

The invention claimed is:

1. A power conditioner for a feeding system comprising:
a first AC-DC and DC-AC converter for performing conversion between AC power and DC power; and
a nickel-metal hydride battery disposed between and connected to a high-voltage cable at DC side of the first AC-DC and DC-AC converter and a low-voltage cable at the DC side of the first AC-DC and DC-AC converter; and
a first transformer which receives AC power from AC power line and feeds the AC power to a feeder;
wherein AC side of the first AC-DC and DC-AC converter is connected to power receiving side or power feeding side of the first transformer; and
wherein the first transformer is a transformer which converts a received three-phase AC voltage into two two-phase AC voltages having a phase difference of 90 degrees and feeds the two two-phase AC voltages.

2. The power conditioner according to claim 1,
wherein the nickel-metal hydride battery has a layer-stacked structure.

3. The power conditioner according to claim 1,
wherein the nickel-metal hydride battery includes a conductive material containing carbon.

4. A power conditioner for a feeding system comprising:
a first AC-DC and DC-AC converter for performing conversion between AC power and DC power;
a nickel-metal hydride battery disposed between and connected to a high-voltage cable at DC side of the first AC-DC and DC-AC converter and a low-voltage cable at the DC side of the first AC-DC and DC-AC converter;
a first transformer which receives AC power from AC power line and feeds the AC power to a feeder;
wherein AC side of the first AC-DC and DC-AC converter is connected to power receiving side or power feeding side in the first transformer;
a second AC-DC and DC-AC converter for performing conversion between AC power and DC power;
wherein the first transformer is a transformer which converts received three-phase AC voltage into two-phase AC voltages and feeds the two-phase AC voltages;
the first AC-DC and DC-AC converter is connected to a feeder which receives one of the two-phase voltages fed from the first transformer;
the second AC-DC and DC-AC converter is connected to a feeder which receives the other of the two-phase voltages fed from the first transformer; and
the nickel-metal hydride battery is disposed between and connected to a common high-voltage cable between DC side of the first AC-DC and DC-AC converter and DC side of the second AC-DC and DC-AC converter and a low-voltage cable between the DC side of the first AC-DC and DC-AC converter and the DC side of the second AC-DC and DC-AC converter.

5. The power conditioner according to claim 4, further comprising:
a first switch provided between the first transformer and the first AC-DC and DC-AC converter; and
a second switch provided between the first transformer and the second AC-DC and DC-AC converter.

6. The power conditioner according to claim 4,
wherein the nickel-metal hydride battery has a layer-stacked structure.

7. The power conditioner according to claim 4,
wherein the nickel-metal hydride battery includes a conductive material containing carbon.

8. A power conditioner for a feeding system comprising:
a first AC-DC and DC-AC converter for performing conversion between AC power and DC power;
a nickel-metal hydride battery disposed between and connected to a high-voltage cable at DC side of the first AC-DC and DC-AC converter and a low-voltage cable at the DC side of the first AC-DC and DC-AC converter;
a first transformer which receives AC power from AC power line and feeds the AC power to a feeder;
wherein AC side of the first AC-DC and DC-AC converter is connected to power receiving side or power feeding side in the first transformer;
a second transformer which receives AC power from AC power line and feeds the AC power to a feeder; and
a second AC-DC and DC-AC converter for performing conversion between AC power and DC power;
wherein each of the first transformer and the second transformer is a transformer which receives single-phase AC voltage;
the first AC-DC and DC-AC converter is connected to a feeder which receives AC voltage fed from the first transformer;
the second AC-DC and DC-AC converter is connected to a feeder which receives AC voltage fed from the second transformer; and
the nickel-metal hydride battery is disposed between and connected to a high-voltage cable between the DC side of the first AC-DC and DC-AC converter and DC side of the second AC-DC and DC-AC converter and a low-voltage cable between the DC side of the first AC-DC and DC-AC converter and the DC side of the second AC-DC and DC-AC converter.

9. The power conditioner according to claim 8, further comprising:
a first switch provided between the first transformer and the first AC-DC and DC-AC converter; and
a second switch provided between the second transformer and the second AC-DC and DC-AC converter.

10. The power conditioner according to claim 8,
wherein the nickel-metal hydride battery has a layer-stacked structure.

11. The power conditioner according to claim 8,
wherein the nickel-metal hydride battery includes a conductive material containing carbon.

12. A power conditioner for a feeding system comprising:
a first AC-DC and DC-AC converter for performing conversion between AC power and DC power; and
a nickel-metal hydride battery disposed between and connected to a high-voltage cable at DC side of the first AC-DC and DC-AC converter and a low-voltage cable at the DC side of the first AC-DC and DC-AC converter;
wherein the nickel-metal hydride battery is composed of one or more battery modules;
each of the battery modules includes plural unit batteries, each of which includes a plate-shaped positive electrode current collector and a plate-shaped negative electrode current collector which are provided opposite to each other; a separator disposed between the positive electrode current collector and the negative electrode current collector; and a positive electrode cell being in contact with the positive electrode current collector, and a negative electrode cell being in contact with the negative electrode current collector, the plural unit batteries being stacked together such that the positive electrode current collector of one of adjacent unit batteries and the negative electrode current collector of the other of the adjacent unit batteries are opposite to each other, and the battery module has between the adjacent unit batteries, a passage through which a gaseous or liquid heat transmitting medium flows.

13. The power conditioner according to claim 12,
wherein the nickel-metal hydride battery has a layer-stacked structure.

14. The power conditioner according to claim 12,
wherein the nickel-metal hydride battery includes a conductive material containing carbon.

15. A power conditioner, for a feeding system comprising:
a first AC-DC and DC-AC converter for performing conversion between AC power and DC power;
a nickel-metal hydride battery disposed between and connected to a high-voltage cable at DC side of the first AC-DC and DC-AC converter and a low-voltage cable at the DC side of the first AC-DC and DC-AC converter; and
a second AC-DC and DC-AC converter for performing conversion between AC power and DC power;
wherein AC side of the first AC-DC and DC-AC converter is connected to an end portion of a first feeding section;
AC side of the second AC-DC and DC-AC converter is connected to an end portion of a second feeding section which is electrically isolated from the first feeding section; and
the nickel-metal hydride battery is disposed between and connected to a common high-voltage cable between the DC side of the first AC-DC and DC-AC converter and DC side of the second AC-DC and DC-AC converter and a low-voltage cable between the DC side of the first AC-DC and DC-AC converter and the DC side of the second AC-DC and DC-AC converter.

16. The power conditioner according to claim 15,
wherein the nickel-metal hydride battery has a layer-stacked structure.

17. The power conditioner according to claim 15,
wherein the nickel-metal hydride battery includes a conductive material containing carbon.

* * * * *